Aug. 23, 1938.   D. TYRER ET AL   2,128,108
MANUFACTURE OF SULPHURIC ACID
Filed Dec. 12, 1934
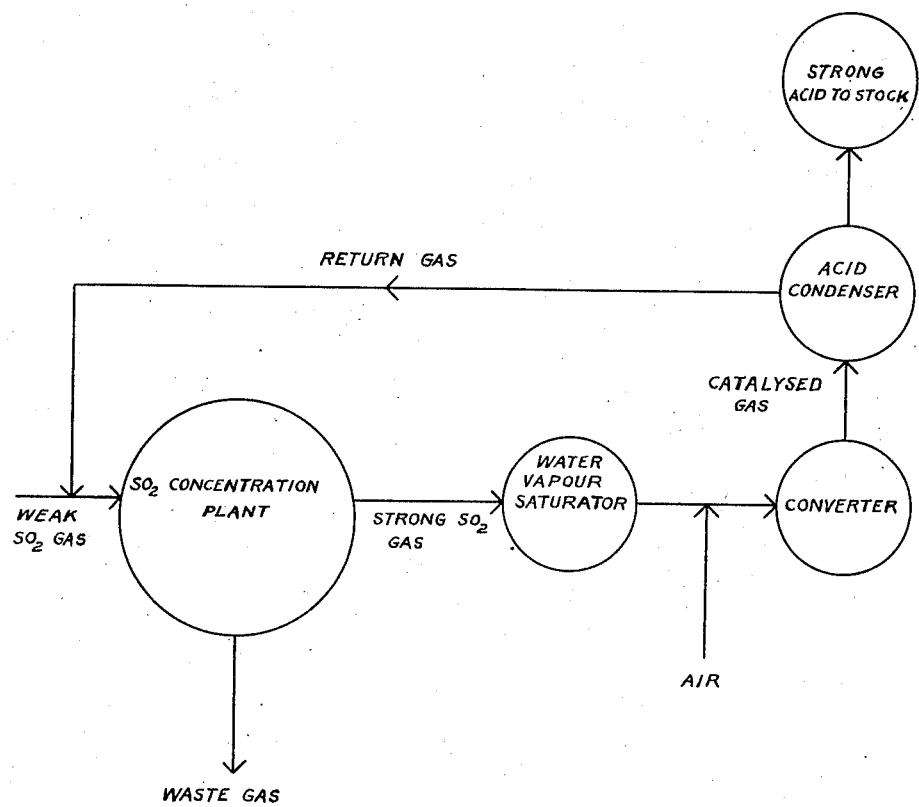
INVENTORS
Daniel Tyrer
Arthur Maurice Clark
BY
ATTORNEY Patented Aug. 23, 1938

2,128,108

UNITED STATES PATENT OFFICE 2,128,108

MANUFACTURE OF SULPHURIC ACID

Daniel Tyrer and Arthur Maurice Clark, Norton-on-Tees, England, assignors to Imperial Chemical Industries Limited, a corporation of Great Britain Application December 12, 1934, Serial No. 757,196
In Great Britain December 13, 1933

3 Claims. (Cl. 23—175)

This invention relates to the manufacture of sulphuric acid by the contact process.

In this process as usually carried out, the gases entering the converter consist of a nitrogen-oxygen-sulphur dioxide mixture, in which the amount of sulphur dioxide is generally between 5 and 7% by volume. These gases are pre-heated in order to maintain the desired reaction temperature, and their rate of flow is controlled so as to obtain as large a percentage conversion of sulphur dioxide as possible. The exit gases from the converter are passed into a large volume of 98 per cent. sulphuric acid, which must be kept in continuous circulation to prevent undue temperature rise. The acid must also be maintained at the same concentration by addition of water. Consequently the heat developed in the catalytic reaction is lost, and in fact additional energy in effecting circulation has to be expended in preventing it from lowering the efficiency of absorption.

We have now found that if gases are used which have a higher sulphur dioxide concentration and a lower inert gas content than those usually employed, improved results can be obtained by increasing the rate of flow through the converter to such an extent that the maximum possible percentage conversion of sulphur dioxide is not obtained. We have also found that it is possible to condense sulphur trioxide together with steam directly to oleum or sulphuric acid of any desired strength.

According to the present invention, therefore, sulphur trioxide is obtained by passing a gas mixture containing at least 10 per cent. of sulphur dioxide and usually at least the stoichiometric quantity of oxygen over a heated contact mass at such a rate that a substantial percentage of sulphur dioxide remains in the exit gases, whereby the rate of production of sulphur trioxide per unit volume of catalyst is greatly increased. The degree of conversion of sulphur dioxide should not exceed about 80 per cent. so that the exit gases will always contain at least about 2 per cent. of sulphur dioxide.

The permissible limits of composition of the initial gas mixture are as follows:—

| | Per cent. |
|---|---|
| Sulphur dioxide | 10–95 |
| Oxygen | 5–90 |
| Inert gases, e. g. nitrogen | 0–85 | but preferably the gas mixture does not contain more than 70 per cent. of inert gases.

After condensation or absorption of the sulphur trioxide the residual sulphur dioxide may be recovered from the catalyzed gas and used for the preparation of further quantities of gas mixture.

Preferably the sulphur trioxide is condensed together with steam, whereby sulphuric acid or oleum is directly formed. The steam may pass through the converter in admixture with the sulphur dioxide containing gases, or alternatively may be added to the gases after their passage through the converter. The steam, or a part thereof, may also be formed by bringing water or dilute sulphuric acid into direct contact with the hot exit gases. By varying the quantity of steam added, sulphuric acid of any desired concentration can be obtained without any substantial fume formation, and it is even possible to make oleum by condensing and cooling a concentrated acid and absorbing the excess sulphur trioxide in it.

When the steam is passed through the converter with the gases, its amount can be controlled by adjusting the saturation temperature of the inlet gases. The thermal energy liberated during condensation can be utilized in any convenient manner, e. g. by raising steam in a waste heat boiler.

The apparatus may be wholly or partly constructed from acid-resisting materials, such as an alloy steel containing 18% chromium and 8% nickel. This precaution will be most advantageous for the portion of the apparatus in which condensation is effected.

The converter is designed in such a manner that the heat of reaction is used internally to heat the inlet gases to the necessary reaction temperature, thereby at the same time moderating the maximum temperature attained in the converter. Any suitable known catalyst may be employed for effecting the conversion, care being taken that catalysts which are not sensitive to water vapour are used when steam is present in the converter.

The process of the present invention permits of considerably greater rates of production of sulphur trioxide for a given volume of catalyst than is possible with previously known processes, and substantial economies in the cost of plant are thereby effected. In addition, the amount of external pre-heat supplied to the gases before entering the converter can be decreased or even entirely eliminated when the gases are sufficiently low in inert gases. A further advantage of the process of the present invention is that the rate of production of sulphuric acid with a given size of converter can be varied within wide limits by simply regulating the rate of gas flow, the temperature of the contact mass remaining within suitable limits without any special control or application of heat.

The gas mixture may be obtained by extracting sulphur dioxide from weak sulphur dioxide containing gas, such as pyrites burner gases, and mixing it with air or oxygen or oxygen-enriched air. In order to obtain the desired gas mixture, sulphur dioxide may be extracted from a portion of the weak gases and added to a suitable volume of the untreated weak gases, with or without the addition of further air or oxygen. A suitable gas mixture may also be obtained by combination of oxygen with sulphur, either in the elementary form or combined, as in pyrites, but in general this will be less desirable than the other methods of obtaining the required mixture, from considerations of cost.

The extraction of the sulphur dioxide from the weak gases can be carried out in any suitable manner, e. g. by the use of solid adsorbents such as active charcoal, by liquefaction or by absorption in suitable solvents. Examples of suitable solvents are aniline and homologues thereof, N-alkyl derivatives of aniline and of its homologues, which form loose compounds with sulphur dioxide; aqueous solutions of alkali hydroxides and/or alkali sulphites containing aluminium chloride; and aqueous solutions containing salts of weak non-volatile acids, e. g. citric acid or mono- or dihydrogen orthophosphates.

When aqueous solutions are employed, from which the sulphur dioxide is driven off by heating, the gas obtained will be charged with steam. Such steam, or a portion thereof, may be advantageously retained in the gas mixture to be submitted to catalysis, in the case where the sulphur trioxide is to be condensed in the presence of steam.

*Example 1*

Gases obtained by the burning of pyrites and containing 7 per cent. of sulphur dioxide were treated for the extraction of sulphur dioxide by washing with a solution containing sodium citrate and mono-ammonium phosphate. The sulphur dioxide recovered from the absorbent solution, without any additional purification, was then dried and mixed with air to give a sulphur dioxide-air mixture containing from 20 to 25 per cent. of sulphur dioxide. This gas mixture, without any external pre-heating, was passed through a converter containing platinized asbestos, at the rate of 1700 litres per hour per gram of platinum (gas measured at 20° C.).

The converter was designed so that the temperature rise due to the exothermic reaction was moderated by the cool inlet gases. The conversion proceeded smoothly at a temperature of about 500° C. The sulphur trioxide in the exit gases from the converter was absorbed in 98 per cent. sulphuric acid in the usual manner, the rate of production of sulphuric acid being 1100 grams per hour per gram of platinum. The exit gases, containing about 7 per cent. of sulphur dioxide, were returned to the concentration plant.

*Example 2*

Gases obtained by the burning of pyrites and containing 7 per cent. of sulphur dioxide were treated for the extraction of sulphur dioxide as described in Example 1. The sulphur dioxide recovered from the absorbent solution was then brought, without cooling, into intimate contact with water at about 80° C., the temperature being such that the sulphur dioxide carried with it the amount of steam which (together with the water vapour in the air subsequently added) was necessary to produce the desired concentration of acid (98 per cent. in the present example). The gas was then mixed with air to give a mixture containing 21.6 per cent. of sulphur dioxide, which was passed, without external pre-heating, through a converter containing platinized asbestos, at the rate of 1240 litres per hour per gram of platinum.

The converter was designed so that the temperature rise due to the exothermic reaction was moderated by the cool inlet gases. The temperature developed in the converter was about 500° C. The hot gases leaving the converter were cooled in a heat exchanger, sulphuric acid at the rate of 800 grams per hour being directly condensed without any fume formation. The exit gases, which contained about 7 per cent. of sulphur dioxide, were returned to the concentration plant.

A suitable form of heat exchanger for cooling the hot gases leaving the converter is a waste heat boiler, the parts exposed to the acid fumes and liquid being made of suitably resistant material, e. g. an alloy steel containing 18 per cent. of chromium and 8 per cent. of nickel, the balance being iron. The heat recovered in the heat exchanger may be utilized to regenerate the absorbent solution in the concentration plant. It is also possible to pass the hot gases leaving the converter through a coil or heat exchanger located in the regenerating vessel for the absorbent solution.

It is preferable to pass the hot exit gases downwardly through the condenser tubes, so as to minimize corrosion. Acid below 94% strength tends to corrode even the chrome-nickel alloy referred to, and if the gases are passed upwardly there is a possibility that the acid condensed near the top of the tubes may be below 94% in strength. By passing the gases downwardly, however, any acid of less than 94% strength will be condensed near the bottom of the tubes and will be immediately mixed with descending stronger acid which has been condensed higher up the tubes.

The advantages obtainable by the process of the present invention over known processes are that the plant, for a given acid output, may be much simpler and smaller; the ordinary purification steps, which are expensive and elaborate, can be replaced by a simple concentration step; no drying of the gases is necessary; and the rate of production of acid per unit volume of catalyst may be very greatly increased. Flexibility is obtained both in the rate of production of acid and in the concentration of the acid produced by a given converter, without loss of sulphur dioxide. Moreover the acid is produced without fume formation and without employing a large volume of 98% sulphuric acid and expending energy in its circulation. External preheating of the inlet gases may be eliminated; the heat of the reaction may be profitably recovered; and cheaper catalysts than platinum e. g. vanadium pentoxide, can be used with equally good results.

In known processes the greater part of the catalyst is engaged in reducing the sulphur dioxide concentration to such a low figure that the exit gases can be discarded economically and without causing a nuisance. According to our invention we operate with a limited degree of conversion per passage, we extract the residual sulphur dioxide from the exit gases and recirculate it to the converter, whereby the following advantages are obtained:—

(1) The rate of production of SO₃ per unit volume of catalyst is greatly increased.

(2) No critical control of temperature is required since the sulphur dioxide content of the exit gas need not be controlled within fine limits.

(3) There is no obnoxious exit gas and all of the sulphur dioxide is converted into sulphuric acid.

By using a gas rich in sulphur dioxide and relatively poor in inert gases the rate of production of SO₃ per unit volume of catalyst is still further increased, and in addition external preheating can be reduced or even eliminated.

A typical plant for carrying out the invention is illustrated diagrammatically in the accompanying drawing, the legends of which make it self-explanatory.

We claim:

1. In the process of making sulphuric acid by the contact process, the steps of burning a source of sulphur in the presence of oxygen to produce a weak sulphur dioxide-containing gas, concentrating the sulphur dioxide, diluting the concentrated sulphur-dioxide gas with an oxygen-containing gas to provide a reaction gas containing at least 10% of sulphur dioxide and at least an amount of oxygen stoichiometrically equivalent to the sulphur dioxide in said reaction gas, contacting said reaction gas at a reaction temperature with a catalyst adapted to promote the reaction $SO_2 + O \rightarrow SO_3$, separately recovering the sulphur trioxide and the sulphur dioxide and mixing the recovered sulphur dioxide with the weak sulphur dioxide-containing gas prior to concentration, the conditions of the reaction, viz., time, temperature, and concentration of sulphur dioxide per unit area of the catalyst being adjusted so that not more than 80% of the sulphur dioxide is converted to sulphur trioxide and so that the recovered sulphur dioxide is of substantially the same order of concentration as the weak sulphur dioxide-containing gas.

2. In a process of making sulphuric acid by the contact process the steps of preparing a reactive gas by concentrating weak sulphur dioxide gas, mixing the so obtained concentrated sulphur dioxide gas with additional weak sulphur dioxide gas, and adjusting the gas mixture to a composition consisting of a substantial amount but not more than 70% inert gases, at least 10% sulphur dioxide, and at least an amount of oxygen stoichiometrically equivalent to the sulphur dioxide in said gas mixture; passing said reactive gas at a reactive temperature through a catalyst adapted to promote the reaction $SO_2 + O \rightarrow SO_3$, separately recovering the sulphur dioxide and sulphur trioxide contained in the gases which have passed through said catalyst, and mixing the recovered sulphur dioxide with orginal weak sulphur dioxide gas, the conditions of the reaction, viz., time, temperature, and concentration of sulphur dioxide per unit area of the catalyst, being adjusted so that not more than 80% of the sulphur dioxide is converted to sulphur trioxide and so that the recovered sulphur dioxide is of about the same concentration as the original weak sulphur dioxide gas.

3. The process of claim 2 in which said reactive gas is prepared by splitting weak sulphur dioxide gas into two parts, one of which is concentrated and the other of which is mixed with the so concentrated sulphur dioxide gas.

DANIEL TYRER.
ARTHUR M. CLARK.